(12) United States Patent
Irifune et al.

(10) Patent No.: US 8,101,683 B2
(45) Date of Patent: Jan. 24, 2012

(54) ADDITION-CURABLE SILICONE EMULSION COMPOSITION

(75) Inventors: Shinji Irifune, Annaka (JP); Tsutomu Nakajima, Takasaki (JP); Kenji Yamamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 75 days.

(21) Appl. No.: 12/790,269

(22) Filed: May 28, 2010

(65) Prior Publication Data

US 2010/0305258 A1    Dec. 2, 2010

(30) Foreign Application Priority Data

May 29, 2009  (JP) ................. 2009-131476

(51) Int. Cl.
  *C08L 83/04* (2006.01)
  *C08J 3/03* (2006.01)
(52) U.S. Cl. .......... 524/858; 524/860; 524/503; 525/55; 525/371; 525/477
(58) Field of Classification Search .............. 524/858, 524/860, 503; 525/55, 371, 477
  See application file for complete search history.

(56) References Cited

U.S. PATENT DOCUMENTS

| 3,900,617 A | 8/1975 | Grenoble |
| 4,849,564 A * | 7/1989 | Shimizu et al. ............... 524/114 |
| 5,015,716 A * | 5/1991 | Togashi et al. ................. 528/15 |
| 2005/0119406 A1 | 6/2005 | Duffy et al. |

FOREIGN PATENT DOCUMENTS

| EP | 0 587 462 A1 | 3/1994 |
| GB | 1 599 209 | 9/1981 |
| JP | 6-47624 | 6/1994 |
| JP | 8-245887 | 9/1996 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

An addition-curable silicone emulsion that exhibits stable curability even with a small amount of platinum. The curable emulsion composition is composed of an emulsion A and an emulsion B described below which are mixed together at the time of use, wherein the ratio of [number-average particle size of dispersed particles in emulsion A]/[number-average particle size of dispersed particles in emulsion B] is within a range from 0.4 to 2.0. The emulsion A comprises a specific alkenyl group-containing organopolysiloxane, a specific organohydrogenpolysiloxane, a nonionic surfactant, a polyvinyl alcohol and water, wherein the number-average particle size of the dispersed particles is within a range from 300 to 1,000 nm. The emulsion B comprises a specific alkenyl group-containing organopolysiloxane, a platinum-based complex, a nonionic surfactant, a polyvinyl alcohol and water, wherein the number-average particle size of the dispersed particles is within a range from 300 to 1,000 nm.

4 Claims, No Drawings

ADDITION-CURABLE SILICONE EMULSION COMPOSITION

BACKGROUND OF THE INVENTION

1. Field of the Invention

The present invention relates to a curable silicone emulsion composition, and relates particularly to an addition reaction-curable silicone emulsion composition for release applications that exhibits excellent curability with a small amount of platinum.

2. Description of the Prior Art

Silicone release compositions have conventionally been used to prevent tack or adhesion between substrates such as papers or plastic films and pressure-sensitive adhesive materials. One known form of this type of silicone release composition is an emulsior-type silicone composition, and the mode of curing for these emulsion-type silicone compositions involves either condensation reaction curing or addition reaction curing.

Of these emulsion-type silicone compositions, the condensation reaction-curable silicone compositions suffer from an extremely short pot life, and are therefore only used in very specific applications. On the other hand, examples of addition reaction-curable silicone compositions that have been proposed include silicone release compositions that are produced by mixing two types of emulsions (see Patent Document 1), release paper compositions that are produced using an emulsion polymerization method (see Patent Document 2), and compositions that employ two liquid catalysts (see Patent Document 3).

However, each of these patented compositions also has drawbacks. In the case of a silicone release composition that is produced by mixing two types of emulsions, because the composition is produced by mixing, the curing rate of the composition obtained following mixing tends to be slow.

In the case of a release paper composition that is produced using an emulsion polymerization method, the properties of the resulting composition are still inferior to those of a composition obtained using a mechanical emulsion method, and the peel strength also tends to be relatively high.

Moreover, in the case of an aforementioned emulsion produced using two liquid catalysts, not only must the two catalysts be mixed together and subjected to self-emulsification at the time of use, but the usable lifetime of the composition also tends to be short. Moreover, in the case of this type of composition, because the overall composition has a three-liquid configuration, the dispersibility of the catalysts within the main emulsion tends to have a significant effect on the properties of the resulting composition.

Patent Document 4 proposes one method for addressing the problems described above, by using an emulsion of a platinum-based catalyst that employs a specific emulsifying agent as the catalyst for a silicone emulsion. However, although there are no particular problems when the amount of Pt used is comparatively large, if the amount of platinum reported in terms of the mass of elemental platinum relative to the total mass of silicone is 100 ppm or less, and particularly 80 ppm or less, then the curability of the composition tends to be unstable.

Although a variety of metals have been proposed for use as the catalyst used in addition reactions, platinum is the most preferred from a practical perspective, and this situation remains unchanged today. However, in recent years, the industrial demands for rare metals such as platinum have continued to increase, and the need to conserve resources means there is much demand for efficient use of these metals. From an economic viewpoint, this increased demand has also caused significant increases in the price of these rare metals, and this trend towards higher prices is particularly marked in the case of platinum. As a result, an addition reaction-curable silicone emulsion that exhibits stable curability even when the required amount of platinum is reduced dramatically has been keenly sought.

[Patent Document 1] U.S. Pat. No. 3,900,617
[Patent Document 2] GB 1599209 A
[Patent Document 3] JP 06-47624 B
[Patent Document 4] JP 08-245887 A

SUMMARY OF THE INVENTION

An object of the present invention is to provide an addition-curable silicone emulsion that exhibits stable curability even with a small amount of platinum.

As a result of intensive investigation, the inventors of the present invention discovered that in a curable emulsion-type silicone prepared by mixing an emulsion A comprising an alkenyl group-containing organopolysiloxane, an organohydrogenpolysiloxane and a reaction retarder as the main components, and an emulsion B comprising an alkenyl group-containing organopolysiloxane and a platinum catalyst as the main components, by ensuring that the ratio between the number-average particle sizes of the dispersed particles within the silicone emulsions A and B, namely the ratio of [number-average particle size of dispersed particles in emulsion A]/[number-average particle size of dispersed particles in emulsion B], was within a range from 0.4 to 2.0, a curable silicone emulsion having excellent curability could be obtained even when the Pt content was 100 ppm or less, and they were therefore able to complete the present invention.

In other words, in order to achieve the above object, the present invention provides a curable emulsion composition composed of 30 to 70 parts by mass of an emulsion A and 30 to 70 parts by mass of an emulsion B described below, which are mixed together at the time of use, wherein the ratio of [number-average particle size of dispersed particles in emulsion A]/[number-average particle size of dispersed particles in emulsion B] is within a range from 0.4 to 2.0.

[Emulsion A]

A silicone emulsion A comprising components (a) to (e) described below, and having a number-average particle size measured by a dynamic light scattering method of 300 to 1,000 nm, in an amount of 30 to 70 parts by mass:

(a) 100 parts by mass of an organopolysiloxane I represented by formula (1) shown below:

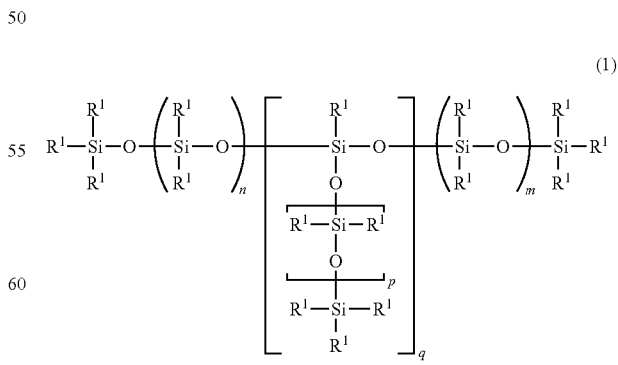

(1)

wherein each $R^1$ independently represents an unsubstituted or substituted monovalent hydrocarbon group of 1 to 10 carbon atoms, provided that at least two $R^1$ groups are alkenyl groups, each of n, m and p represents a positive number, and q represents a number within a range from 0 to 10, provided that n, m, p and q are numbers that yield a viscosity at 25° C. for the organopolysiloxane I of 30 to 10,000 mPa·s, (b) 1 to 50 parts by mass of an organohydrogenpolysiloxane I comprising at least three hydrogen atoms bonded directly to silicon atoms within each molecule, represented by formula (2) shown below:

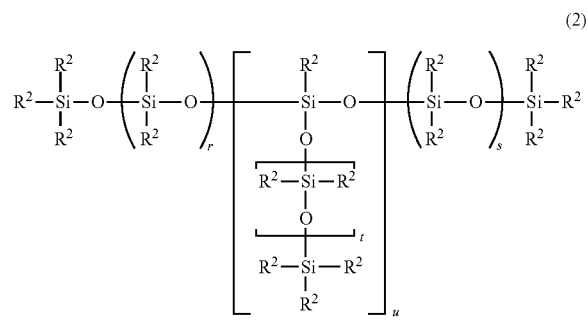

wherein each $R^2$ independently represents an unsubstituted or substituted monovalent hydrocarbon group of 1 to 10 carbon atoms or a hydrogen atom, provided that at least three $R^2$ are hydrogen atoms, each of r, s and t represents a positive number, and u represents a number within a range from 0 to 10, provided that r, s, t and u are numbers that yield a viscosity at 25° C. for the organohydrogenpolysiloxane I of 5 to 2,000 mPa·s, (c) 0.5 to 10 parts by mass of a nonionic surfactant,
(d) 1 to 20 parts by mass of a polyvinyl alcohol, and
(e) water.

[Emulsion B]

A silicone emulsion B comprising components (f) to (j) described below, and having a number-average particle size measured by a dynamic light scattering method of 300 to 1,000 nm, in an amount of 30 to 70 parts by mass:

(f) 100 parts by mass of an organopolysiloxane II represented by formula (3) shown below:

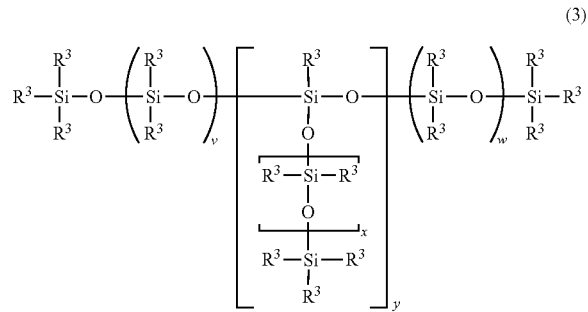

wherein each $R^3$ independently represents an unsubstituted or substituted monovalent hydrocarbon group of 1 to 10 carbon atoms, provided that at least two $R^3$ groups are alkenyl groups, each of v, w and x represents a positive number, and y represents a number within a range from 0 to 10, provided that v, w, x and y are numbers that yield a viscosity at 25° C. for the organopolysiloxane II of 30 to 10,000 mPa·s, (g) a platinum-based complex, in an amount that provides from 0.001 to 0.05 parts by mass of elemental platinum,
(h) 0.5 to 10 parts by mass of a nonionic surfactant,
(i) 1 to 20 parts by mass of a polyvinyl alcohol, and
(j) water.

The silicone emulsion composition of the present invention provides excellent curability and favorable stability of that curability despite containing only a small amount of platinum.

DETAILED DESCRIPTION OF THE PREFERRED EMBODIMENTS

A more detailed description of the silicone emulsion composition of the present invention is presented below.

First is a more detailed description of each of the components that constitute the composition.

—Silicone Emulsion A—

<(a) Organopolysiloxane I>

The organopolysiloxane I of component (a) of the silicone emulsion A of the present invention is represented by formula (1) shown below.

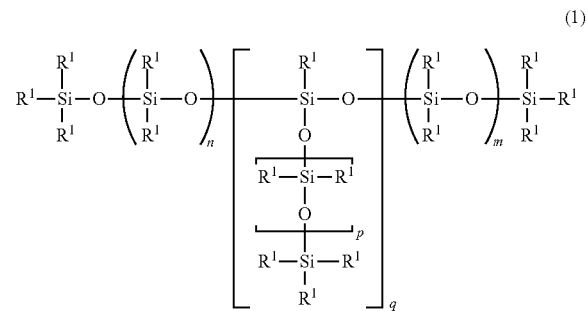

In the above formula, each $R^1$ represents an unsubstituted or substituted monovalent hydrocarbon group of 1 to 10 carbon atoms, selected from amongst alkyl groups such as a methyl group, ethyl group, propyl group or butyl group, alkenyl groups such as a vinyl group, allyl group, butenyl group, pentenyl group or hexenyl group, cycloalkyl groups such as a cyclohexyl group, aryl groups such as a phenyl group or tolyl group, and groups in which some or all of the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. The plurality of $R^1$ groups may be the same or different, but at least two $R^1$ groups must be alkenyl groups. The alkenyl groups are preferably alkenyl groups of 2 to 8 carbon atoms, and are most preferably a vinyl group, an allyl group or a hexenyl group. Further, in terms of achieving favorable curability and peeling properties, the monovalent hydrocarbon groups other than the alkenyl groups are preferably alkyl groups or aryl groups, and methyl groups are particularly desirable. n, m, p and q are numbers that yield a viscosity at 25° C. for the organopolysiloxane I of 30 to 10,000 mPa·s, and q is within the range $0 \leq q \leq 10$.

The blend amount of the organopolysiloxane I is used as the standard against which the blend amounts of the other components within the silicone emulsion A are measured, and is therefore specified as 100 parts by mass.

<(b) Organohydrogenpolysiloxane I>

The organohydrogenpolysiloxane I of component (b) is represented by formula (2) shown below.

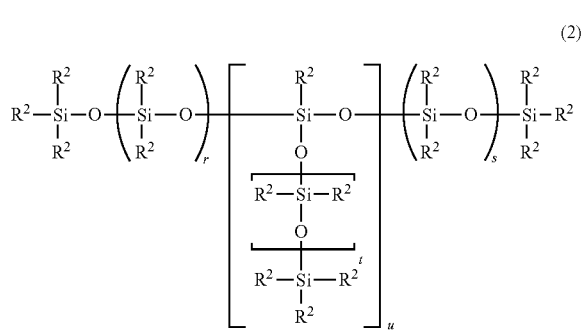

(2)

In the above formula, each $R^2$ represents either a hydrogen atom, or an unsubstituted or substituted monovalent hydrocarbon group of 1 to 10 carbon atoms selected from amongst alkyl groups such as a methyl group, ethyl group, propyl group or butyl group, cycloalkyl groups such as a cyclohexyl group, aryl groups such as a phenyl group or tolyl group, and groups in which some or all of the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group (although a methyl group is preferred as the monovalent hydrocarbon group). The plurality of $R^2$ may be the same or different, but at least three $R^2$ must be hydrogen atoms. r, s, t and u are positive numbers that yield a viscosity at 25° C. for the organohydrogenpolysiloxane I of 5 to 2,000 mPa·s, and u is within the range $0 \leq u \leq 10$. The blend amount of this organohydrogenpolysiloxane I is within a range from 1 to 50 parts by mass, and is preferably from 1 to 30 parts by mass.

<(c) Nonionic Surfactant>

The component (c) may be any nonionic surfactant, and the component (h) within the silicone emulsion B is essentially the same as this component (c). This component is used to emulsify the mixture of the components (a) and (b) described above and water.

Examples of the nonionic surfactant used in the present invention include alkyl aryl ether surfactants such as polyoxyethylene nonylphenyl ether and polyoxyethylene octylphenyl ether, alkyl ether surfactants such as polyoxyethylene lauryl ether and polyoxyethylene tridecyl ether, and alkyl ester surfactants such as polyoxyethylene oleate and polyoxyethylene laurate. From the viewpoints of the emulsifying properties and safety, a polyoxyethylene alkyl ether is preferred. Moreover, the nonionic surfactant preferably has an HLB value within a range from 10 to 15, a pH value of not more than 6.5 and more preferably within a range from 4.5 to 6.5, and an ionic conductivity of not more than 30 μS/cm and more preferably within a range from 1 to 30 μS/cm. If a surfactant is used that does not satisfy these requirements for an HLB value of 10 to 15, a pH of not more than 6.5 and an ion conductivity of not more than 30 μS/cm, then the emulsion composition tends to be more likely to degrade over time. Cationic surfactants and anionic surfactants may also be used in combination with the nonionic surfactant, provided their addition has no adverse effects on the effects of the emulsion composition of the present invention, and adding these other surfactants can be expected to provide further improvements in the wettability and leveling properties of the emulsion composition.

<(d) Polyvinyl Alcohol>

Any polyvinyl alcohol (hereafter abbreviated as PVA) may be used as the component (d). This PVA is an essential component that acts as an assistant to the surfactant of the component (c) in promoting the emulsification and stabilizing the resulting emulsion state. The component (i) of the silicone emulsion B is essentially the same as this component (d).

All manner of PVAs can be used as the PVA, although the degree of saponification is preferably within a range from 70 to 95 mol %, and more preferably from 85 to 95 mmol %, and the viscosity at 20° C. of a 4% by mass aqueous solution of the PVA is preferably within a range from 4 to 100 mPa·s, and more preferably from 10 to 100 mPa·s. If the degree of saponification is less than 70 mol % or greater than 96 mol %, then the emulsion stabilizing effect provided by the PVA tends to be inadequate. Further, if the viscosity at 20° C. of a 4% by mass aqueous solution of the PVA is less than 4 mPa·s, then the emulsion stabilizing effect tends to weaken, whereas a viscosity exceeding 100 mPa·s tends to cause a deterioration in the coating properties. Accordingly, the PVA is preferably selected so as to satisfy the ranges described above.

<(e) Water>

The water of component (e) acts as the dispersion medium. The amount of water used may be selected as appropriate. Specifically, the amount of water used typically yields a solid fraction concentration for the emulsion A of 1 to 70% by mass.

For the silicone emulsion obtained by emulsifying the above components (a) to (e), the number-average particle size measured by a dynamic light scattering method must be within a range from 300 to 1,000 nm, and is preferably from 300 to 800 nm. A particle size smaller than 300 nm is effectively impossible to achieve in an emulsification using the components (c) and (d), whereas if the number-average particle size exceeds 1,000 nm, then the stability of the silicone emulsion tends to deteriorate.

—Silicone Emulsion B—

<(f) Organopolysiloxane II>

The organopolysiloxane II of component (f) of the silicone emulsion B is represented by formula (3) shown below.

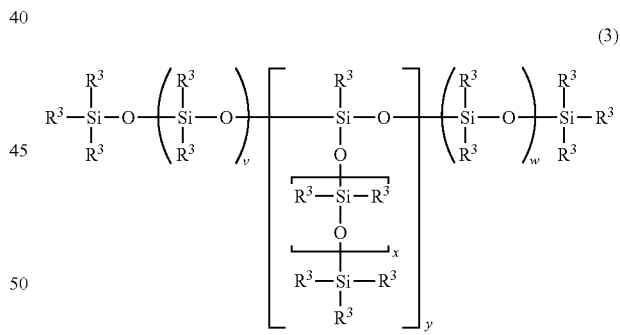

(3)

In the above formula, each $R^3$ represents an unsubstituted or substituted monovalent hydrocarbon group of 1 to 10 carbon atoms, selected from amongst alkyl groups such as a methyl group, ethyl group, propyl group or butyl group, cycloalkyl groups such as a cyclohexyl group, alkenyl groups such as a vinyl group, allyl group, butenyl group, pentenyl group or hexenyl group, aryl groups such as a phenyl group or tolyl group, and groups in which some or all of the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. The plurality of $R^3$ groups may be the same or different, but at least two $R^3$ groups must be alkenyl groups.

The alkenyl groups are preferably alkenyl groups of 2 to 8 carbon atoms, and are most preferably a vinyl group, an allyl group or a hexenyl group. Further, in terms of achieving favorable curability and peeling properties, the monovalent hydrocarbon groups other than the alkenyl groups are preferably alkyl groups or aryl groups, and methyl groups are particularly desirable. v, w, x and y are numbers that yield a viscosity at 25° C. far the organopolysiloxane II of 30 to 10,000 mPa·s, and y is within the range $0 \leqq y \leqq 10$.

The blend amount of the organopolysiloxane II is used as the standard against which the blend amounts of the other components within the silicone emulsion B are measured, and is therefore specified as 100 parts by mass.

<(g) Platinum-Based Complex>

A platinum-based complex (and particularly a complex of a polysiloxane and either platinum or a platinum-based compound, or a complex salt of chloroplatinic acid and any of various olefins) is typically used as the component (g). Particularly in those cases where the platinum-based complex contains a polysiloxane, the viscosity of the complex at 25° C. is preferably within a range from 10 to 500 mPa·s.

Furthermore, the amount used of this component (g) can be adjusted so as to provide an amount of platinum that can undergo curing under the curing conditions being used. In terms of satisfying the requirement to conserve resources, the amount of the component (g), reported as the mass of elemental platinum within the complex, may be 100 ppm or less relative to the total mass of the silicone composition, and in terms of further improving the economic viability of the composition, need be not more than 80 ppm.

<(h) Nonionic Surfactant>

The component (h) may employ the same nonionic surfactants as those described above for the component (c).

<(i) Polyvinyl Alcohol>

The component (i) may employ the same polyvinyl alcohols as those described above for the component (d).

<(j) Water>

The water of component (j) acts as the dispersion medium. The amount of water used may be selected as appropriate. Specifically, the amount of water used typically yields a solid fraction concentration for the emulsion B of 1 to 70% by mass.

For the silicone emulsion obtained by emulsifying the above components (f) to (j), the number-average particle size measured by a dynamic light scattering method must be within a range from 300 to 1,000 nm, and is preferably from 300 to 800 nm. A particle size smaller than 300 nm is effectively impossible to achieve in an emulsification using the components (h) and (i), whereas if the number-average particle size exceeds 1,000 nm, then the stability of the silicone emulsion tends to deteriorate.

The ratio between the number-average particle sizes of the dispersed particles within the silicone emulsions A and B composed of the above components, namely the ratio of [number-average particle size of dispersed particles in emulsion A]/[number-average particle size of dispersed particles in emulsion B], must be within a range from 0.4 to 2.0, and is preferably within a range from 0.8 to 1.5. If this particle size ratio falls outside this range, then the curability of the emulsion composition deteriorates dramatically. Further, the silicone emulsions A and B are mixed together at the time of use, and the blend amounts of A and B are set so that the amount of the emulsion B is within a range from 30 to 70 parts by mass per 30 to 70 parts by mass of the emulsion A (provided that the combination of the two emulsions totals 100 parts by mass).

These emulsions A and B can each be obtained by uniformly mixing together predetermined amounts of the various components that constitute the emulsion, and then using a homomixer or homogenizer or the like to emulsify the mixture. The number-average particle sizes of the dispersed particles within these silicone emulsions A and B can be adjusted so as to satisfy the predetermined ranges specified above by controlling factors such as the blend ratio between the various components, the temperature during emulsification, the emulsification time, and the operating conditions such as the rate of rotation for the stirrer such as a homomixer.

—Optional Components

These emulsions A and B may also include a variety of additives, provided the inclusion of these additives does not impair the effects of the present invention. Examples of these additives include retarding agents such as various organic nitrogen compounds, organophosphorus compounds and acetylene-based compounds, which are added were required as pot life extenders for retarding the activity of the platinum-based complex, preservatives such as sorbic acid, sorbate salts and butyric acid, water-soluble resins such as methylcellulose and sodium carboxymethylcellulose which may be added for the purposes of preventing penetration of the emulsion into porous substrates and increasing the peel strength, leveling agents or small amounts of solvents which may be used for improving the leveling properties during application of the emulsior, and small amounts of non-reactive organopolysiloxanes which may be added as slipperiness-imparting agents.

Application of the silicone emulsion composition of the present invention to a substrate can be achieved using any arbitrary method such as roll coating, gravure coating, air knife coating, wire coating, doctor coating or brush coating.

A cured film having the desired peeling properties can be formed by applying the silicone emulsion composition of the present invention, at a thickness that is sufficient to provide a solid fraction coating of 0.1 to 5.0 g/m², to a flexible thin-film material such as a paper or film, and subsequently using a heated roller, a heated drum or a circulating hot-air dryer or the like to conduct a treatment at a temperature of 80 to 200° C. for a period of 5 seconds to 3 minutes.

EXAMPLES

A more detailed description of the present invention is presented below based on a series of examples, although the present invention is in no way limited by these examples. In the following examples and comparative examples, unless stated otherwise, viscosity values represent measured values for the absolute viscosity that have been measured at 25° C. using a BM rotational viscometer. Further, the number-average particle sizes and curability properties reported for the products of the present invention and the comparative products in the examples and comparative examples were evaluated using the methods described below. The results are shown in Table 1.

[Number-Average Particle Size]

The number-average particle size of the dispersed particles within each of the prepared silicone emulsions was measured using a Submicron Particle Size Analyzer COULTER N4 Plus manufactured by Beckman Coulter, Inc., which uses a dynamic light scattering photon correlation method as a measurement principle.

[Curability]

A silicone emulsion composition was prepared by mixing together 50 parts by mass of each of the silicone emulsions A and B, and then diluting the resulting mixture with water to obtain a silicone fraction concentration of 5% by mass. Using a wire bar, this composition was applied to the surface of a glassine paper (grammage: 60 g/m$^2$) in an amount sufficient to form a coating with a silicone solid fraction of approximately 1.0 g/m$^2$, and the paper was then placed inside a hot-air circulating drying oven at a temperature of 150° C. for a period of 15, 18, 20 or 25 seconds. The coated paper was then removed from the drying oven, a finger was rubbed 10 times back and forth across the coated surface (the cured surface), and the curability was evaluated on the basis of any changes to the coated surface. Namely, compositions for which the rubbing left no marks on the coated surface were recorded using the symbol O in Table 1, compositions for which the rubbing left some slight marks were recorded using the symbol Δ, and compositions for which the coated film detached or became cloudy were recorded using the symbol x.

Preparation Example 1 of Silicone Emulsion A

A container was charged with 100 parts by mass of a component (a) consisting of a methylvinylpolysiloxane, which comprised a main chain composed entirely of dimethylsiloxane units with the exception of both molecular chain terminals which were blocked with dimethylvinylsilyl groups, and had a viscosity of 400 mPa·s and a vinyl value of 0.018 mol/100 g, 5.8 parts by mass of a component (b) consisting of a methylhydrogenpolysiloxane, which comprised a main chain composed entirely of dimethylsiloxane units and methylhydrogensiloxane units with the exception of both molecular chain terminals which were blocked with trimethylsilyl groups, and had a viscosity of 50 mPa·s and an SiH value of 1.1 mol/100 g, 1.1 parts by mass of a component (c) consisting of a polyoxyethylene alkyl ether surfactant (HLB: 13.6, pH: 5.4, ion conductivity: 9.8 μS/cm), 8.0 parts by mass of a component (d) consisting of a polyvinyl alcohol having a degree of saponification of 90 mol % and a viscosity at 20° C. for a 4% by mass aqueous solution of 20 mPa·s, and 0.3 parts by mass of ethynylcyclohexanol as a reaction retarder. The mixture inside the container was then mixed at a temperature of 10 to 40° C. and at a rotational rate of 5,000 rpm using a homomixer while 6.0 parts by mass of the 152.0 parts by mass of water of a component (e) was added. Following confirmation of a phase inversion (emulsification), stirring was continued for a further 80 minutes using the homomixer, all of the remaining water of the component (e) was then added, and a homogenization treatment was performed under conditions including a pressure of 30 MPa, yielding a homogenous silicone emulsion A-1. The number-average particle size of the dispersed particles within this emulsion was 470 nm.

Preparation Example 2 of Silicone Emulsion A

A container was charged with 100 parts by mass of a component (a) consisting of a methylvinylpolysiloxane, which comprised a main chain composed entirely of dimethylsiloxane units with the exception of both molecular chain terminals which were blocked with dimethylvinylsilyl groups, and had a viscosity of 400 mPa·s and a vinyl value of 0.018 mol/100 g, 5.8 parts by mass of a component (b) consisting of a methylhydrogenpolysiloxane, which comprised a main chain composed entirely of dimethylsiloxane units and methylhydrogensiloxane units with the exception of both molecular chain terminals which were blocked with trimethylsilyl groups, and had a viscosity of 50 mPa·s and an SiH value of 1.1 mol/100 g, 1.1 parts by mass of a component (c) consisting of a polyoxyethylene alkyl ether surfactant (HLB: 13.6, pH: 5.4, ion conductivity: 9.8 μS/cm), 8.0 parts by mass of a component (d) consisting of a polyvinyl alcohol having a degree of saponification of 90 mol % and a viscosity at 20° C. for a 4% by mass aqueous solution of 20 mPa·s, and 0.3 parts by mass of ethynylcyclohexanol as a reaction retarder. The mixture inside the container was then mixed at a temperature of 10 to 40° C. and at a rotational rate of 5,000 rpm using a homomixer while 12.0 parts by mass of the 152.0 parts by mass of water of a component (e) was added. Following confirmation of a phase inversion (emulsification), stirring was continued for a further 40 minutes using the homomixer, all of the remaining water of the component (e) was then added, and a homogenization treatment was performed under conditions including a pressure of 30 MPa, yielding a homogenous silicone emulsion A-2. The number-average particle size of the dispersed particles within this emulsion was 750 nm.

Preparation Example 3 of Silicone Emulsion A

A container was charged with 100 parts by mass of a component (a) consisting of a methylvinylpolysiloxane, which comprised a main chain composed entirely of dimethylsiloxane units with the exception of both molecular chain terminals which were blocked with dimethylvinylsilyl groups, and had a viscosity of 400 mPa·s and a vinyl value of 0.018 mmol/100 g, 5.8 parts by mass of a component (b) consisting of a methylhydrogenpolysiloxane, which comprised a main chain composed entirely of dimethylsiloxane units and methylhydrogensiloxane units with the exception of both molecular chain terminals which were blocked with trimethylsilyl groups, and had a viscosity of 50 mPa·s and an SiH value of 1.1 mol/100 g, 1.1 parts by mass of a component (c) consisting of a polyoxyethylene alkyl ether surfactant (HLB: 13.6, pH: 5.4, ion conductivity: 9.8 μS/cm), 8.0 parts by mass of a component (d) consisting of a polyvinyl alcohol having a degree of saponification of 90 mol % and a viscosity at 20° C. for a 4% by mass aqueous solution of 20 mPa·s, and 0.3 parts by mass of ethynylcyclohexanol as a reaction retarder. The mixture inside the container was then mixed at a temperature of 10 to 40° C. and at a rotational rate of 5,000 rpm using a homomixer while 15.0 parts by mass of the 152.0 parts by mass of water of a component (e) was added. Following confirmation of a phase inversion (emulsification), stirring was continued for a further 10 minutes using the homomixer, all of the remaining water of the component (e) was then added, and a homogenization treatment was performed under conditions including a pressure of 30 MPa, yielding a homogenous silicone emulsion A-3. The number-average particle size of the dispersed particles within this emulsion was 1,200 nm.

Preparation Example 1 of Silicone Emulsion B

A container was charged with 100 parts by mass of a component (f) consisting of a methylvinylpolysiloxane, which comprised a main chain composed entirely of dimethylsiloxane units with the exception of both molecular chain terminals which were blocked with dimethylvinylsilyl groups, and had a viscosity of 400 mPa·s and a vinyl value of 0.018 mol/100 g, 2.1 parts by mass of a component (g) consisting of a platinum-vinylsiloxane complex salt (platinum content, calculated as an amount of elemental platinum: 5,000 ppm), 1.1 parts by mass of a component (h) consisting of a polyoxyethylene alkyl ether surfactant (HLB: 13.6, pH: 5.4, ion conductivity: 9.8 μS/cm), and 8.0 parts by mass of a component (i) consisting of a polyvinyl alcohol having a degree of saponification of 90 mol % and a viscosity at 20° C. for a 4% by mass aqueous solution of 20 mPa·s. The mixture inside the container was then mixed at a temperature of 10 to 40° C. and at a rotational rate of 5,000 rpm using a homomixer while 6.0 parts by mass of the 146.0 parts by mass of water of a component (j) was added. Following confirmation of a phase inversion (emulsification), stirring was continued for a further 80 minutes using the homomixer, all of the remaining water of the component (j) was then added, and a homogenization treatment was performed under conditions including a pressure of 30 MPa, yielding a homogenous silicone emulsion B-1. The platinum content of this emulsion relative to the mass of silicone was approximately 103 ppm, and the number-average particle size of the dispersed particles within this emulsion was 490 nm.

Preparation Example 2 of Silicone Emulsion B

A container was charged with 100 parts by mass of a component (f) consisting of a methylvinylpolysiloxane, which comprised a main chain composed entirely of dimethylsiloxane units with the exception of both molecular chain terminals which were blocked with dimethylvinylsilyl groups, and had a viscosity of 400 mPa·s and a vinyl value of 0.018 mol/100 g, 2.1 parts by mass of a component (g) consisting of a platinum-vinyl siloxane complex salt (platinum content, calculated as an amount of elemental platinum: 5,000 ppm), 1.1 parts by mass of a component (h) consisting of a polyoxyethylene alkyl ether surfactant (HLB: 13.6, pH: 5.4, ion conductivity: 9.8 μS/cm), and 8.0 parts by mass of a component (i) consisting of a polyvinyl alcohol having a degree of saponification of 90 mol % and a viscosity at 20° C. for a 4% by mass aqueous solution of 20 mPa·s. The mixture inside the container was then mixed at a temperature of 10 to 40° C. and at a rotational rate of 5,000 rpm using a homomixer while 12.0 parts by mass of the 146.0 parts by mass of water of a component (j) was added. Following confirmation of a phase inversion (emulsification), stirring was continued for a further 40 minutes using the homomixer, all of the remaining water of the component (j) was then added, and a homogenization treatment was performed under conditions including a pressure of 30 MPa, yielding a homogenous silicone emulsion B-2. The platinum content of this emulsion relative to the mass of silicone was approximately 103 ppm, and the number-average particle size of the dispersed particles within this emulsion was 800 nm.

Example 1

A silicone emulsion composition of the present invention was prepared by mixing 50 parts by mass of the silicone emulsion A-1 and 50 parts by mass of the silicone emulsion B-1. The platinum content of this composition relative to the mass of silicone was approximately 51 ppm. The curability of the composition was evaluated using the method described above. The result is shown in Table 1.

Example 2

A silicone emulsion composition of the present invention was prepared by mixing 50 parts by mass of the silicone emulsion A-1 and 50 parts by mass of the silicone emulsion B-2. The platinum content of this composition relative to the mass of silicone was approximately 51 ppm. The curability of the composition was evaluated using the method described above. The result is shown in Table 1.

Example 3

A silicone emulsion composition of the present invention was prepared by mixing 50 parts by mass of the silicone emulsion A-2 and 50 parts by mass of the silicone emulsion B-1. The platinum content of this composition relative to the mass of silicone was approximately 51 ppm. The curability of the composition was evaluated using the method described above. The result is shown in Table 1.

Example 4

A silicone emulsion composition of the present invention was prepared by mixing 50 parts by mass of the silicone emulsion A-2 and 50 parts by mass of the silicone emulsion B-2. The platinum content of this composition relative to the mass of silicone was approximately 51 ppm. The curability of the composition was evaluated using the method described above. The result is shown in Table 1.

Comparative Example 1

A silicone emulsion composition was prepared by mixing 50 parts by mass of the silicone emulsion A-3 and 50 parts by mass of the silicone emulsion B-1. The platinum content of this composition relative to the mass of silicone was approximately 51 ppm. The curability of the composition was evaluated using the method described above. The result is shown in Table 1.

Comparative Example 2

A silicone emulsion composition was prepared by mixing 50 parts by mass of the silicone emulsion A-3 and 50 parts by mass of the silicone emulsion B-2. The platinum content of this composition relative to the mass of silicone was approximately 51 ppm. The curability of the composition was evaluated using the method described above. The result is shown in Table 1.

TABLE 1

| | Example 1 | Example 2 | Example 3 | Example 4 | Comparative example 1 | Comparative example 2 |
|---|---|---|---|---|---|---|
| Silicone emulsion A, particle size of dispersed particles | A-1, 470 | A-1, 470 | A-2, 750 | A-2, 750 | A-3, 1200 | A-3, 1200 |
| Silicone emulsion B, particle size of dispersed particles | B-1, 490 | B-2, 800 | B-1, 490 | B-2, 800 | B-1, 490 | B-2, 800 |
| Particle size ratio | 0.96 | 0.59 | 1.53 | 0.94 | 2.44 | 1.50 |
| Platinum content within emulsion composition (ppm) | 51 | 51 | 51 | 51 | 51 | 51 |

TABLE 1-continued

| | | Example 1 | Example 2 | Example 3 | Example 4 | Comparative example 1 | Comparative example 2 |
|---|---|---|---|---|---|---|---|
| Curability | 15 seconds | Δ | x | x | x | x | x |
| | 18 seconds | ○ | Δ | Δ | Δ | x | x |
| | 20 seconds | — | ○ | ○ | ○ | x | Δ |
| | 25 seconds | — | — | — | — | Δ | ○ |

The curable silicone emulsion composition of the present invention is useful for forming a releasable film on the surface of a substrate such as a paper or a plastic film, and can be used to prevent tack or adhesion between these types of substrates and pressure-sensitive adhesive materials.

What is claimed is:

1. A curable emulsion composition composed of 30 to 70 parts by mass of an emulsion A and 30 to 70 parts by mass of an emulsion B described below which are mixed together at time of use, wherein a ratio of [number-average particle size of dispersed particles in emulsion A]/[number-average particle size of dispersed particles in emulsion B] is within a range from 0.4 to 2.0, the emulsion A comprises components (a) to (e) described below and having a number-average particle size measured by a dynamic light scattering method of 300 to 1,000 nm:

(a) 100 parts by mass of an organopolysiloxane I represented by formula (1) shown below:

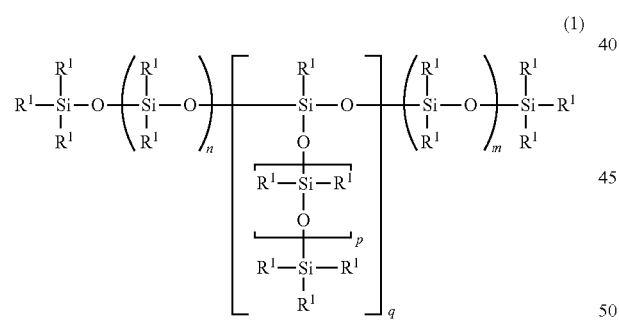

wherein each $R^1$ independently represents an unsubstituted or substituted monovalent hydrocarbon group of 1 to 10 carbon atoms, provided that at least two $R^1$ groups are alkenyl groups, each of n, m and p represents a positive number, and q represents a number within a range from 0 to 10, provided that n, m, p and q are numbers that yield a viscosity at 25° C. for the organopolysiloxane I of 30 to 10,000 mPa·s, (b) 1 to 50 parts by mass of an organohydrogenpolysiloxane I comprising at least three hydrogen atoms bonded directly to silicon atoms within each molecule, represented by formula (2) shown below:

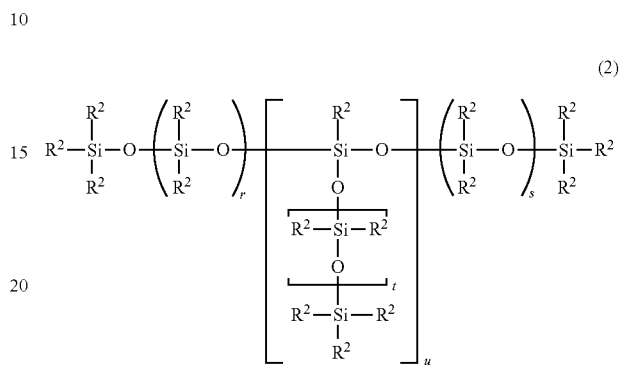

wherein each $R^2$ independently represents an unsubstituted or substituted monovalent hydrocarbon group of 1 to 10 carbon atoms or a hydrogen atom, provided that at least three $R^2$ are hydrogen atoms, each of r, s and t represents a positive number, and u represents a number within a range from 0 to 10, provided that r, s, t and u are numbers that yield a viscosity at 25° C. for the organohydrogenpolysiloxane I of 5 to 2,000 mPa·s, (c) 0.5 to 10 parts by mass of a nonionic surfactant, (d) 1 to 20 parts by mass of a polyvinyl alcohol, and (e) water, and the emulsion B comprises components (f) to (j) described below and having a number-average particle size measured by a dynamic light scattering method of 300 to 1,000 nm:

(f) 100 parts by mass of an organopolysiloxane II represented by formula (3) shown below:

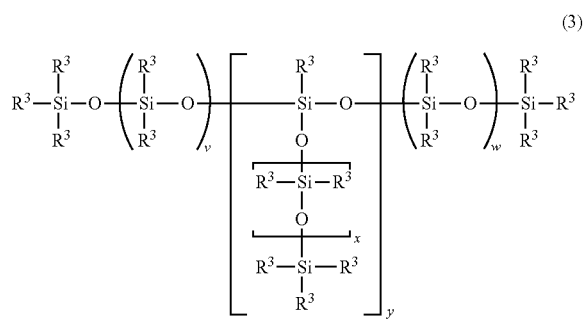

wherein each $R^3$ independently represents an unsubstituted or substituted monovalent hydrocarbon group of 1 to 10 carbon atoms, provided that at least two $R^3$ groups are alkenyl groups, each of v, w and x represents a positive number, and y represents a number within a range from 0 to 10, provided that v, w, x and y are numbers that yield a viscosity at 25° C. for the organopolysiloxane II of 30 to 10,000 mPa·s, (g) a platinum-based complex, in an amount that provides from 0.001 to 0.05 parts by mass of elemental platinum, (h) 0.5 to 10 parts by mass of a nonionic surfactant,
(i) 1 to 20 parts by mass of a polyvinyl alcohol, and
(j) water.

2. The curable emulsion composition according to claim 1, wherein one or both of the component (c) and the component (h) is a nonionic surfactant having an HLB value within a range from 10 to 15, a pH of not more than 6.5, and an ion conductivity of not more than 30 μS/cm.

3. The curable emulsion composition according to claim 1, wherein one or both of the component (d) and the component (i) is a polyvinyl alcohol having a degree of saponification within a range from 70 to 95 mol %, and a viscosity at 20° C. for a 4% by mass aqueous solution of the polyvinyl alcohol of 4 to 100 mPa·s.

4. The curable emulsion composition according to claim 1, wherein an amount of elemental platinum within the component (g) relative to a total amount of silicone components within the composition is not more than 100 ppm.

* * * * *